United States Patent
Behzad

(10) Patent No.: US 8,364,106 B2
(45) Date of Patent: *Jan. 29, 2013

(54) MULTIPLE BAND DIRECT CONVERSION RADIO FREQUENCY TRANSCEIVER INTEGRATED CIRCUIT

(75) Inventor: Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/861,365

(22) Filed: Aug. 23, 2010

(65) Prior Publication Data

US 2010/0317300 A1    Dec. 16, 2010

Related U.S. Application Data

(63) Continuation of application No. 11/173,072, filed on Jul. 1, 2001, now Pat. No. 7,787,843.

(60) Provisional application No. 60/666,125, filed on Mar. 29, 2005.

(51) Int. Cl.
*H04B 1/18* (2006.01)
*H04M 1/00* (2006.01)

(52) U.S. Cl. .............. 455/168.1; 455/324; 455/333; 455/552.1

(58) Field of Classification Search ............. 455/73, 455/78, 103, 168.1, 324, 333, 552.1, 553.1
See application file for complete search history.

(56) References Cited

U.S. PATENT DOCUMENTS

2003/0203743 A1    10/2003    Sugar

*Primary Examiner* — Quochien B Vuong
(74) *Attorney, Agent, or Firm* — Garlick & Markison; Kevin L. Smith

(57) ABSTRACT

A multiple band direct conversion radio frequency (RF) transceiver integrated circuit (IC) includes a multiple band direct conversion transmitter section, a multiple band direct conversion receiver section, and a local oscillation module. The multiple band direct conversion transmitter section includes a transmit baseband module and a multiple frequency band transmission module. The multiple band direct conversion receiver section includes a multiple frequency band reception module and a receiver baseband module. The local oscillation generation module is coupled to generate a first frequency band local oscillation when the multiple band direct conversion RF transceiver IC is in the first mode and coupled to generate a second frequency band local oscillation when the multiple band direct conversion RF transceiver IC is in the second mode.

20 Claims, 13 Drawing Sheets

MULTIPLE BAND DIRECT CONVERSION RADIO FREQUENCY TRANSCEIVER INTEGRATED CIRCUIT

CROSS REFERENCE TO RELATED PATENTS/PATENT APPLICATIONS

The present U.S. Utility Patent Application claims priority pursuant to 35 U.S.C. §120, as a continuation, to the following U.S. Utility Patent Application, which is hereby incorporated herein by reference in its entirety and made part of the present U.S. Utility Patent Application for all purposes:

1. U.S. Utility application Ser. No. 11/173,072, entitled "Multiple band direct conversion radio frequency transceiver integrated circuit," filed Jul. 1, 2005, pending, which claims priority pursuant to 35 U.S.C. §119(e) to the following U.S. Provisional Patent Application, which is hereby incorporated herein by reference in its entirety and made part of the present U.S. Utility Patent Application for all purposes:
    a. U.S. Provisional Application Ser. No. 60/666,125, entitled "Multiple band direct conversion radio frequency transceiver integrated circuit," filed Mar. 29, 2005, now expired.

BACKGROUND

1. Technical Field

This invention relates generally to wireless communication systems and more particularly to multiple frequency band wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a wireless transceiver to operate in accordance with a particular wireless communication protocol, it must be designed to receive and transmit radio frequency (RF) signals within a given carrier frequency band using a particular baseband encoding, modulation, and/or scrambling protocol. For instance, IEEE 802.11a prescribes a frequency bands of 5.15-5.25 GHz, 5.25-5.35 GHz, and 5.725-5.825 GHz, using a modulation scheme of binary phase shift keying (BPSK), quadrature phase shift keying (QPSK), sixteen quadrature amplitude modulation (16-QAM), or sixty-four quadrature amplitude modulation (64-QAM) and convolutional coding having a coding rate of ½, ⅔, or ¾. As another example, IEEE 802.11b prescribes a frequency band of 2.400 to 2.483 GHz and modulates that wave using Direct Sequence Spread Spectrum (DSSS) or Frequency Hopping Spread Spectrum (FHSS). As yet another example, IEEE 802.11g prescribes a frequency band of 2.400 to 2.483 GHz using a modulation scheme of binary phase shift keying (BPSK), quadrature phase shift keying (QPSK), sixteen quadrature amplitude modulation (16-QAM), or sixty-four quadrature amplitude modulation (64-QAM).

From the above examples, for a wireless transceiver to operate in accordance with IEEE 802.11a, it must be able to transmit and receive RF signals in one of the 5 GHz frequency bands, while, to operate in accordance with IEEE 802.11b, or g, the wireless transceiver must be able to transmit and receive RF signals in the 2.4 GHz frequency band. Because of the substantial difference in frequencies and the design of the transceiver, a wireless transceiver cannot effectively transmit RF signals in the different 5 GHz frequency bands and/or in the 2.4 GHz frequency band. Nevertheless, attempts have been made to integrated multiple frequency band transceivers as described in "A Single-Chip Digitally Calibrated 5.15-5.825 GHz 0.18 μm CMOS Transceiver for 802.11a Wireless LAN", By Jason Vassiliou et, al. IEEE Journal of Solid-State circuits, Volume 38, No. 12, December 2003; and "A Single-Chip Dual-Band Tri-Mode CMOS Transceiver for IEEE 802.11a/b/g WLAN", by Masoud Zargari, et. al., ISSCC 2004/Session 5/WLAN Transceivers/5.4.

While the prior art is making advances in wireless transceivers, there exists a need for an integrated multiple band direct conversion wireless communication transceiver.

BRIEF SUMMARY OF THE INVENTION

The present invention is directed to apparatus and methods of operation that are further described in the following Brief Description of the Several Views of the Drawings, the Detailed Description of the Drawings, and the claims. Other features and advantages of the present invention will become apparent from the following detailed description of the invention made with reference to the accompanying drawings.

DETAILED DESCRIPTION OF THE DRAWINGS

Figure 1:
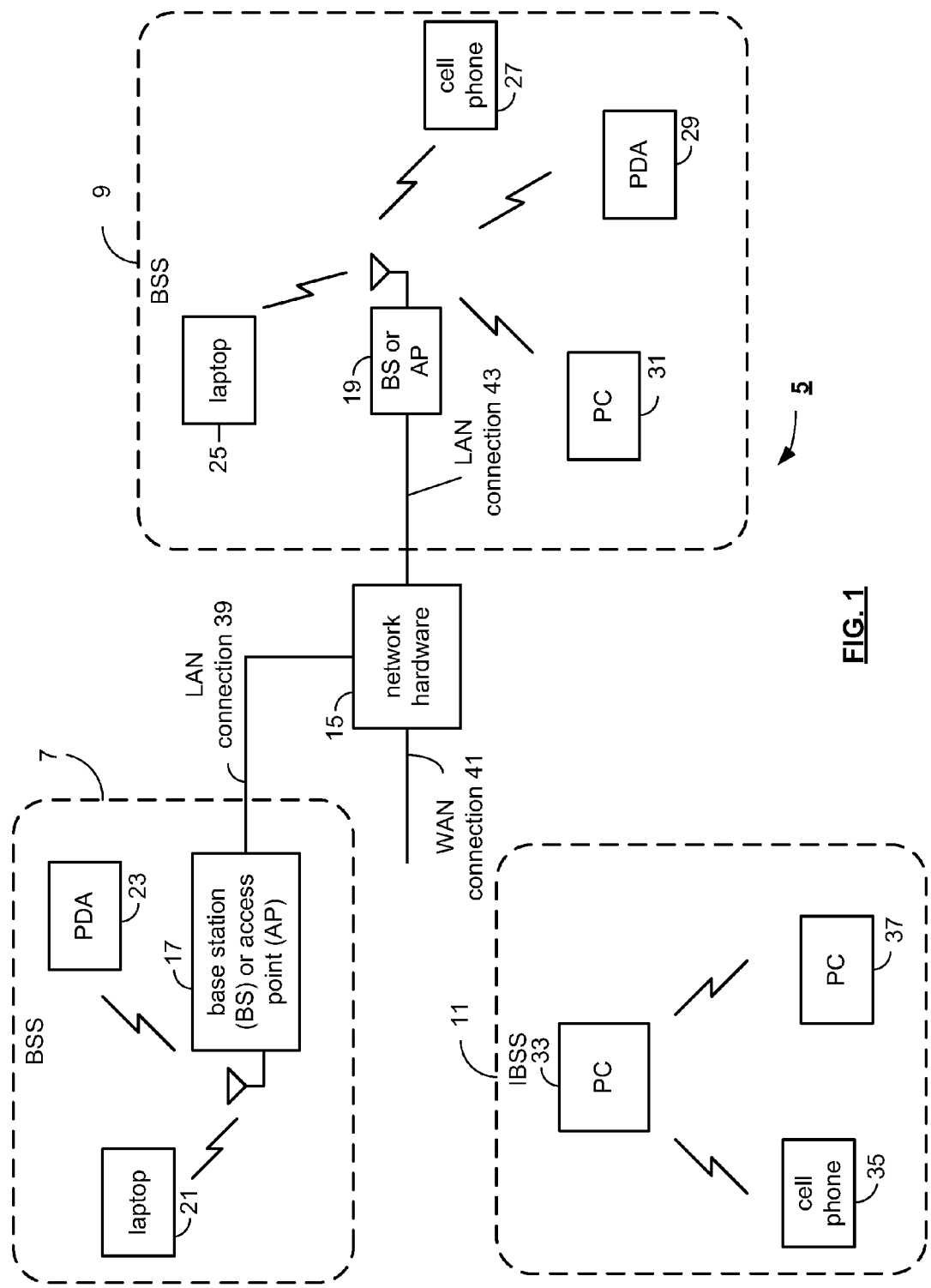
FIG. 1 is a schematic block diagram of a wireless communication system in accordance with the present invention.

FIG. 1 illustrates a schematic block diagram of a communication system 5 that includes basic service set (BSS) areas 7 and 9, an independent basic service set (IBSS) 11, and a network hardware device 15. Each of the BSS areas 7 and 9 include a base station and/or access point 17, 19 and a plurality of wireless communication devices 21-23, 25-31. The IBSS 11 includes a plurality of wireless communication devices 33-37. Each of the wireless communication devices 21-37 may be laptop host computers 21 and 25, personal digital assistant hosts 23 and 29, personal computer hosts 31 and 33 and/or cellular telephone hosts 27 and 35.

The base stations or access points 17 and 19 are operably coupled to the network hardware 15 via local area network connections 39 and 43. The network hardware 15, which may be a router, switch, bridge, modem, system controller, et cetera provides a wide area network connection 41 for the communication system 5. Each of the base stations or access points 17, 19 has an associated antenna or antenna array to communicate with the wireless communication devices in its area. Typically, the wireless communication devices register with a particular base station or access point 17, 19 to receive services from the communication system 5. For direct connections (i.e., point-to-point communications) within IBSS 11, wireless communication devices 33-37 communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver to facilitate direct and/or in-direct wireless communications within the communication system 5. The radio transceiver, as will be described in greater detail with reference to FIGS. 2-13.

Figure 2:
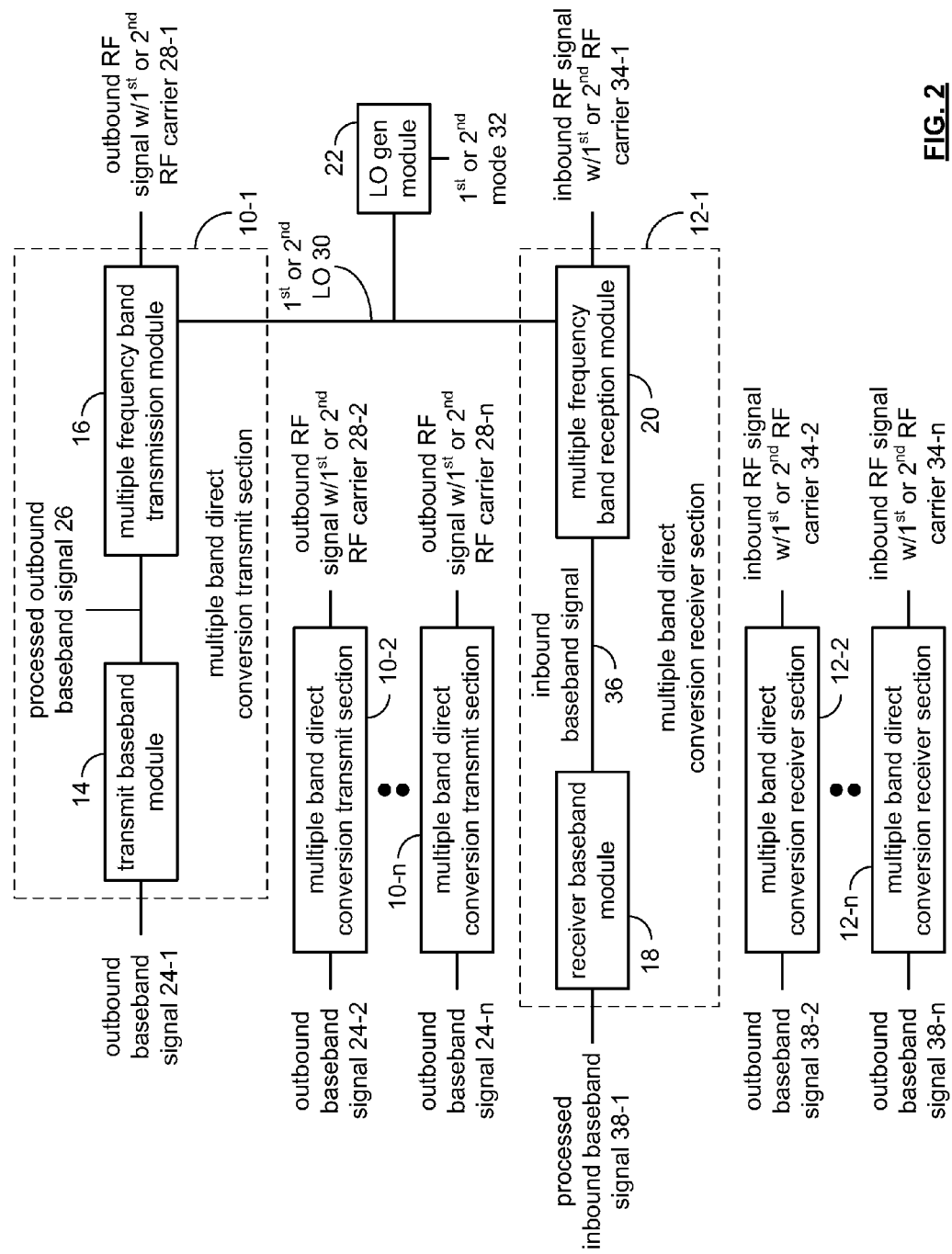
FIG. 2 is a schematic block diagram of a radio transceiver of a wireless communication device in accordance with the present invention.

FIG. 2 is a schematic block diagram of a multiple band MIMO (multiple input multiple output) direct conversion radio frequency (RF) transceiver integrated circuit (IC) that includes a plurality of multiple band direct conversion transmit sections 10-1 through 10-$n$, a plurality of multiple band direct conversion receiver sections 12-1 through 12-$n$, and a local generation module 22. Each of the multiple band direct conversion transmit sections 10-1 through 10-$n$ includes a transmit baseband module 14 and a multiple frequency band transmission module 16. Each of the multiple band direct conversion receiver sections 12-1 through 12-$n$ includes a receiver baseband module 18 and a multiple frequency band reception module 20.

In operation, each of the multiple band direct conversion transmit sections 10-1 through 10-$n$ may receive an outbound baseband signal 24-1 through 24-$n$. The outbound baseband signal 24-1 through 24-$n$ may be in accordance with one or more wireless communication standards such as IEEE802.11a, b, g, n, and/or further extensions or variations thereof. In one embodiment, each of the multiple band direct conversion transmit sections 10-1 through 10-$n$ are tuned to convert outbound baseband signals 24-1 through 24-$n$ into outbound RF signals with a $1^{st}$ or $2^{nd}$ RF carrier 28-1 through 28-$n$. In addition, each of the multiple band direct conversion receiver sections 12-1 through 12-$n$ are tuned to converter inbound RF signals 34-1 through 34-$n$ into processed inbound baseband signals 38-1 through 38-$n$. In such an embodiment, the $1^{st}$ RF carrier may be within the 2.4 GHz band (e.g., 2.400 GHz to 2.483) and the $2^{nd}$ RF carrier maybe within one of the 5 GHz frequency bands (e.g., 5.15-5.25 GHz, 5.25-5.35 GHz, and 5.725-5.825 GHz).

For example, for a 4 by 4 MIMO wireless communication, the IC of FIG. 2 would include 4 multiple band direct conversion transmit sections 10 and 4 multiple band direct conversion receiver sections 12. A MIMO baseband processor (not shown) converts a stream of outbound data into a plurality of outbound baseband signals 24 and converts a plurality of processed inbound baseband signals 38 into a stream of inbound data. Each of the multiple band direction conversion transmit sections 10 and 12 are tuned to convert their respective outbound baseband signals 24 into corresponding outbound RF signals having the $1^{st}$ or the $2^{nd}$ RF carrier 28. Similarly, each of the multiple band direct conversion receiver sections 12 are tuned to convert their respective inbound RF signals having the first or second RF carrier 34 into corresponding processed inbound baseband signals 38. The selection of the $1^{st}$ or the $2^{nd}$ RF carrier frequency maybe based on which RF carrier will provide a more efficient wireless communication (e.g., has less interference such that the data can be transmitted at a higher rate with less errors), a default protocol, user preference, capabilities of devices involved in the wireless communication, and/or system requirements.

As one of ordinary skill in the art will appreciate, the IC of FIG. 2 may include any number of multiple band direct conversion transmit sections 10 and any number of multiple band direct conversion receiver sections 12. In addition, any number in any combination of the multiple band direct conversion transmit sections 10 and multiple band direct conversion receiver sections 12 may be active to facilitate a MIMO wireless communication. For example, if the IC includes M number of multiple band direct conversion transmit sections 10 and N number of multiple band direct conversion receiver sections 12, where M may or may not equal N, the IC may support an M by N MIMO wireless communications. In addition, the IC may active less than M multiple band direct conversion transmit sections 10 and/or may active less than N multiple band direct conversion receiver sections 12 to support m by n MIMO wireless communications, where m represents the number of the M multiple band direct conversion transmit sections 10 that are activated and n represents the number of the N multiple band direct conversion receiver sections 12 that are activated.

As one of ordinary skill in the art will further appreciate, the IC may include one multiple band direct conversion transmit section 10 and one multiple band direction conversion receiver section 12 1 to provide multiple band direction conversion transceiver. In this instance, a baseband processing module (not shown) produces the outbound baseband signals 24 from outbound data and produces inbound data from the processed inbound baseband signals 38 in accordance with a wireless communication protocol (e.g., IEEE 802.11a, b, g). The multiple band direct conversion transmit section 10 converts the outbound baseband signals 24 in to outbound RF signals having the first or the second RF carrier frequency 28, while the multiple band direct conversion receiver section 12 converts inbound RF signals having the first or the second RF carrier frequency 34 into the processed inbound baseband signals 38.

Regardless of the numbers of the multiple band direct conversion transmit and receiver sections 10 and 12 contained on the IC, each of the multiple band direct conversion transmit sections 10 operate in a similar manner and each of the multiple band direct conversion receiver sections 12 operate in a similar manner. For instance, to facilitate the baseband to RF conversion within each of the multiple band direct conversion transmit sections 10, the transmit baseband module 14 processes the outbound baseband signals 24-$x$ (where x represents 1 through n) to produce processed outbound baseband signals 26. The processing includes one or more of filtering, analog-to-digital conversion, gain adjust and/or phase adjust of the outbound baseband signals 24-$x$. Note that the outbound baseband signals 24-$x$ may include an in-phase component and a quadrature component such that the processed outbound baseband signals 26 include a processed in-phase component and a processed quadrature component.

Within each of the multiple band direct conversion transmit sections 10, the multiple frequency band transmission module 16 converts the processed outbound baseband signals 26 into outbound RF signals 28-$x$ based on a $1^{st}$ or $2^{nd}$ local oscillation 30, which is produced by local oscillation generation module 22. In one embodiment, the $1^{st}$ carrier frequency and the first local oscillation 30-1 will correspond to a frequency within the 2.4 GHz band. Accordingly, the multiple frequency band transmission module 16 converts the processed outbound baseband signals 26 into outbound RF signals having a 2.4 GHz RF carrier frequency 28-$x$. Alternatively, the RF carrier frequency and the second local oscillation 30-2 maybe within one of the 5 GHz frequency bands. In this instance, the LO generation module 22 generates a local oscillation within one of the 5 GHz bands such that the multiple frequency band transmission module 16 converts the processed outbound baseband signals 26 into the outbound RF signals with a 5 GHz RF carrier 28-$x$.

Each of the multiple band direct conversion receiver sections 12-$x$ receives inbound RF signals with the $1^{st}$ or $2^{nd}$ RF carrier 34-$x$ and, via the multiple frequency band reception module 20, converts the inbound RF signal into inbound baseband signals 36 in accordance with the $1^{st}$ or $2^{nd}$ local oscillation 30. For example, the inbound RF signals may have a carrier frequency in accordance with IEEE 802.11a, or in accordance with IEEE 802.11b or g. Depending on which wireless communication standard is supported, the LO generation module 22 generates the $1^{st}$ local oscillation to have a frequency corresponding to the $1^{st}$ RF carrier frequency (e.g., within the 2.4 GHz frequency band) or the $2^{nd}$ local oscillation having a frequency corresponding to the $2^{nd}$ RF carrier (e.g., within one of the 5 GHz frequency bands).

The receiver baseband module 18 converts the inbound baseband signals 36 into process inbound baseband signals 38-$x$. The processing may include one or more of filtering, analog-to-digital conversion, gain adjust, phase adjust, and/or received signal strength measurements. The receiver baseband module 18 will be described in greater detail with reference to FIG. 12.

Figure 3:
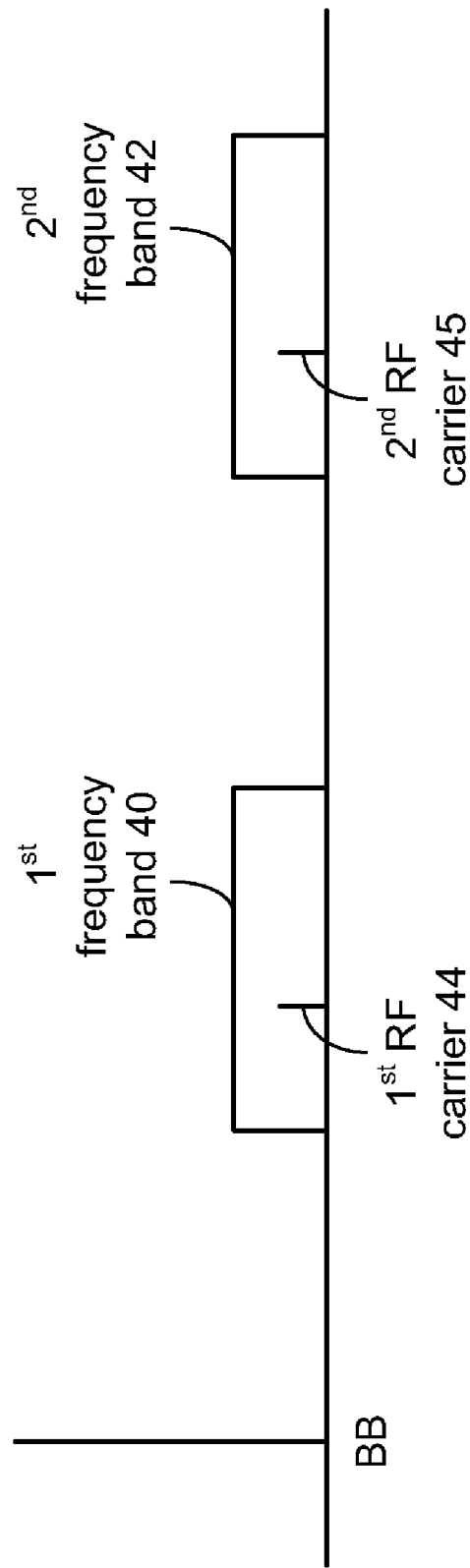
FIG. 3 is a frequency diagram of frequency bands in accordance with the present invention.

FIG. 3 is a diagram of the frequency bands that may be used in accordance with an embodiment of the present invention. As shown, a $1^{st}$ frequency band 40 is separate from a $2^{nd}$ frequency band 42. In one embodiment, the $1^{st}$ frequency band 40 may correspond with a 2.4 GHz frequency band (e.g., 2.400 GHz to 2.483 GHz) and the $2^{nd}$ frequency band 42 may correspond to one or more 5 GHz frequency bands (e.g., 5.15-5.25 GHz, 5.25-5.35 GHz, and 5.725-5.825 GHz).

Within the $1^{st}$ frequency band 40, a $1^{st}$ RF carrier frequency 44 may be positioned to correspond with a particular channel within the $1^{st}$ frequency band 40, or may correspond to the center of the frequency band 40. Similarly, a $2^{nd}$ RF carrier 45 is shown within the $2^{nd}$ frequency band 42. The $2^{nd}$ RF carrier frequency 45 may correspond to a particular channel within the $2^{nd}$ frequency band 42 and/or the center frequency of the frequency band. Note that the $1^{st}$ and/or $2^{nd}$ frequency band 40 and 42 may include a plurality of frequency bands, for example the $2^{nd}$ frequency band may include a frequency band from 5.15 GHz to 5.25 GHz, from 5.25 GHz to 5.35 GHz, and from 5.725 GHz to 5.825 GHz. Further note that the $1^{st}$ frequency band 40 may be one of the 5.15 GHz to 5.25 GHz, from 5.25 GHz to 5.35 GHz, and from 5.725 GHz to 5.825 GHz frequency bands and the $2^{nd}$ frequency band 42 may be another one of the 5.15 GHz to 5.25 GHz, from 5.25 GHz to 5.35 GHz, and from 5.725 GHz to 5.825 GHz frequency bands. Still further note that the $1^{st}$ and $2^{nd}$ frequency bands 40 and 42 may include different frequency bands than the ones listed in the preceding examples as may be allocated for wireless communications by a controlling governmental entity.

Figure 4:
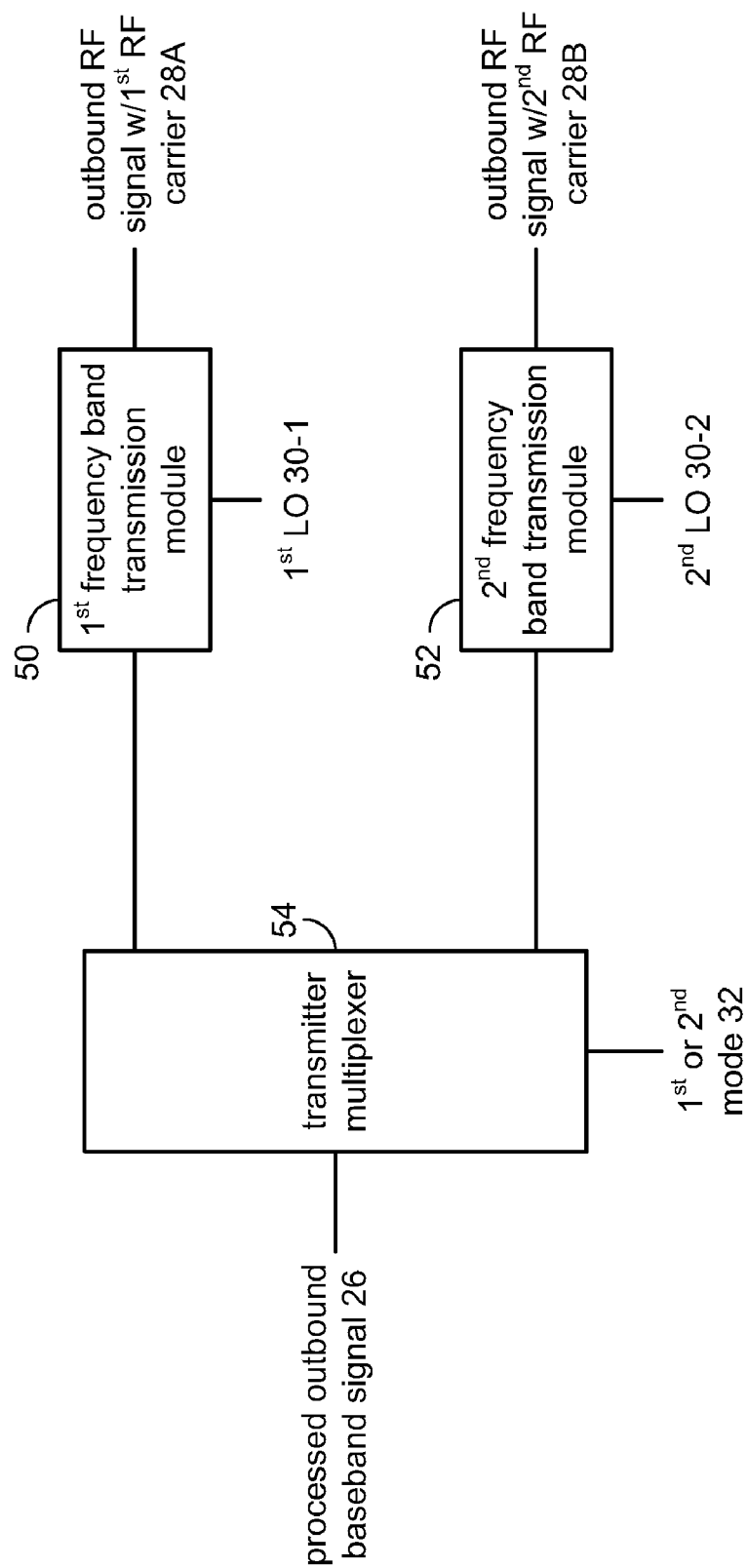
FIG. 4 is a schematic block diagram of a multiple frequency transmission module in accordance with the present invention.

FIG. 4 is a schematic block diagram of an embodiment of a multiple frequency band transmission module 16 that includes a $1^{st}$ frequency band transmission module 50, a $2^{nd}$ frequency band transmission module 52 and a transmitter multiplexer 54. In operation, the process outbound baseband signals 26 are provided to the transmit multiplexer 54. Based on a $1^{st}$ or $2^{nd}$ mode signal 32, the multiplexer 54 provides the processed outbound baseband signals 26 to either the $1^{st}$ frequency baseband transmission module 50 or to the $2^{nd}$ frequency baseband transmission module 52. In one embodiment, the $1^{st}$ mode of mode signal 32 corresponds to transmitting the outbound RF signals having an RF carrier frequency within a $1^{st}$ frequency band 42 and the $2^{nd}$ mode of the mode signal 32 corresponds to transmitting the outbound RF signals having an RF carrier frequency within the $2^{nd}$ frequency band 42.

Accordingly, for the $1^{st}$ mode of the mode signal 32, the transmitter multiplexer 54 provides the processed outbound baseband signals 26 to the $1^{st}$ frequency baseband transmission module 50. The $1^{st}$ frequency band transmission module 50, which will be described in greater detail with reference to FIG. 5, converts the processed outbound baseband signals 26 into outbound RF signals with the $1^{st}$ RF carrier 28a in accordance with the $1^{st}$ local oscillation 30-1. In one embodiment, the $1^{st}$ RF carrier corresponds to a frequency within the $1^{st}$ frequency band 40.

For the $2^{nd}$ mode of the mode signal 32, the transmitter multiplexer 54 provides the processed outbound baseband signals 26 to the $2^{nd}$ frequency baseband transmission module 52. The $2^{nd}$ frequency baseband transmission module 52, which will be described in greater detail with reference to FIG. 5, converts the processed outbound baseband signals 26 into outbound RF signals with the $2^{nd}$ RF carrier 28-b in accordance with the $2^{nd}$ local oscillation 30-2.

As one of average skill in the art will appreciate, the processed outbound baseband signals 26 may have an in-phase component and a quadrature component. Accordingly, each of the $1^{st}$ and $2^{nd}$ frequency band transmission modules 50 and 52 produces the outbound RF signals 28a and 28b from I and Q components of the processed outbound baseband signals 26 in accordance with I and Q components of the $1^{st}$ or $2^{nd}$ local oscillations 30-1 or 30-2.

Figure 5:
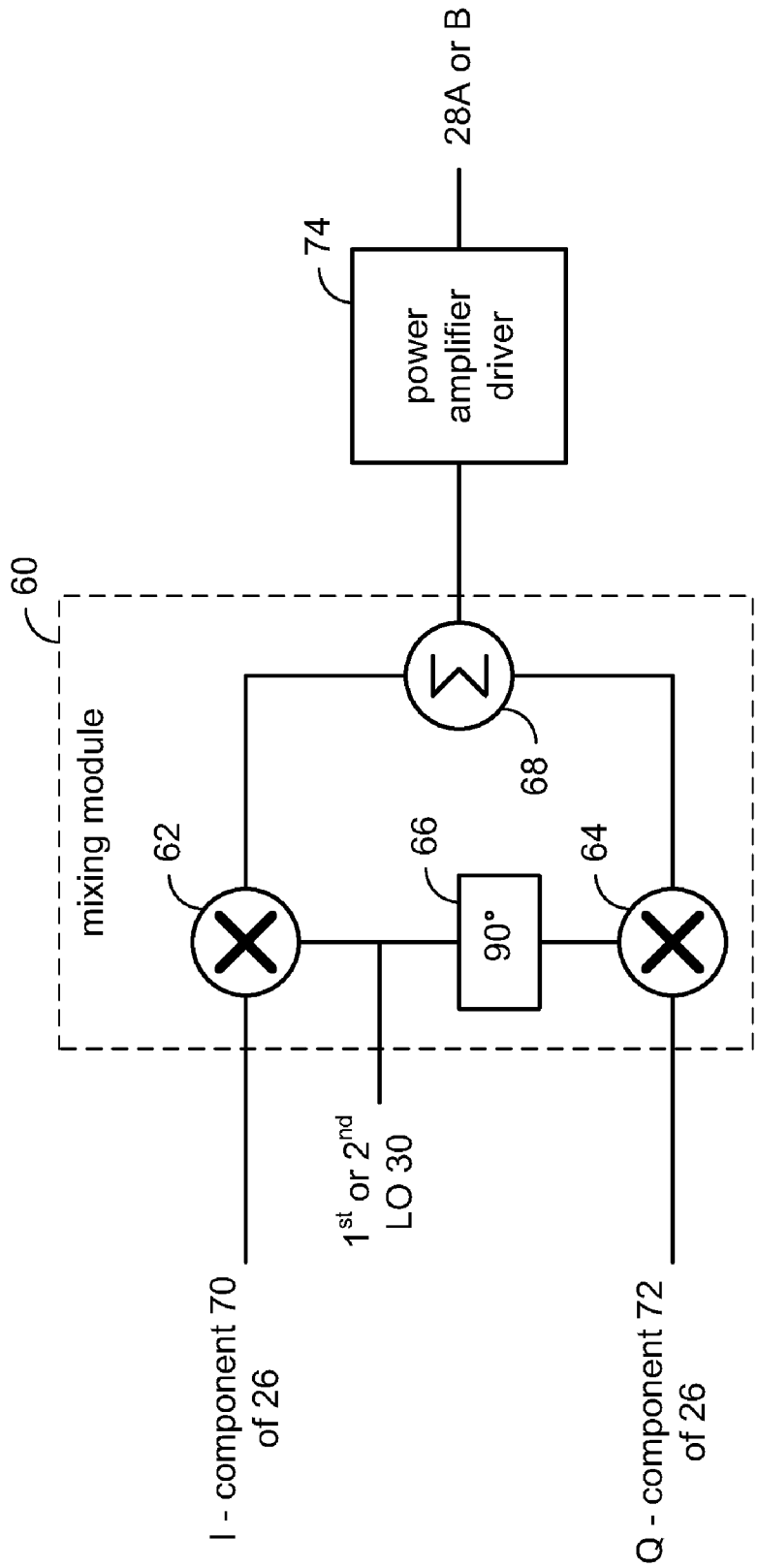
FIG. 5 is a schematic block diagram of a $1^{st}$ frequency or a $2^{nd}$ frequency band transmission module in accordance with the present invention.

FIG. 5 is a schematic block diagram of an embodiment of the $1^{st}$ or $2^{nd}$ frequency band transmission module 50 or 52 that includes a mixing module 60 and a power amplifier driver 74. The mixing module 60 includes a $1^{st}$ mixer 62, a $2^{nd}$ mixer 64, a 90° phase shift module 66 and a summation module 68. The $1^{st}$ mixer 62 mixes an I component 70 of the processed outbound baseband signals 26 with an in-phase component of the local oscillation 30 to produce a $1^{st}$ mixed signal. The $2^{nd}$ mixer 64 mixes a quadrature component 72 of the processed outbound baseband signals 26 with a 90° phase shifted representation of the local oscillation 30, which corresponds to a Q component, to produce a $2^{nd}$ mixed signal. The summing module 68 sums the $1^{st}$ and $2^{nd}$ mixed signals to produce a summed mixed signal. The power amplifier driver 74 amplifies the summed mixed signals to produce the outbound RF signals 28a or 28b.

Figure 6:
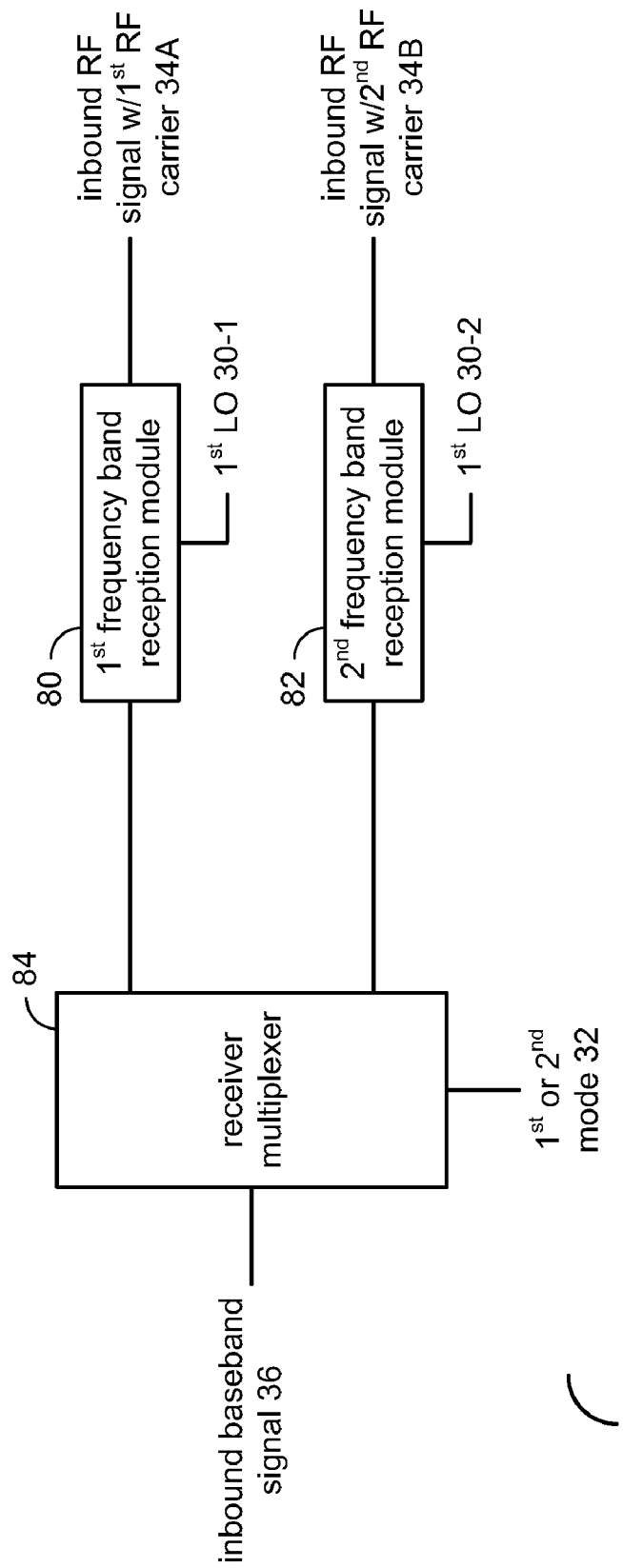
FIG. 6 is a schematic block diagram of a multiple frequency band reception module in accordance with the present invention.

FIG. 6 is a schematic block diagram of an embodiment of a multiple frequency band reception module 20 that includes a $1^{st}$ frequency band reception module 80, a $2^{nd}$ frequency band reception module 82 and a receiver multiplexer 84. The $1^{st}$ frequency band reception module 80 converts inbound RF signals having a $1^{st}$ carrier frequency 34a into baseband signals in accordance with the $1^{st}$ local oscillation 30-1. The $2^{nd}$ frequency baseband reception module 82 converts inbound RF signals with the $2^{nd}$ RF carrier 34-b into baseband signals in accordance with the $2^{nd}$ local oscillation 30-2. In one embodiment, the $1^{st}$ RF carrier and $1^{st}$ local oscillation 30-1 are in the 2.4 GHz frequency band and the $2^{nd}$ RF carrier and $2^{nd}$ local oscillation 30-2 are in one of the 5 GHz frequency bands.

The receiver multiplexer 84 is operably coupled to output the baseband signals 36 from the $1^{st}$ or $2^{nd}$ frequency band reception modules 80 or 82 based on the $1^{st}$ or $2^{nd}$ mode signal 32 to produce the inbound baseband signal 36. In one embodiment, the $1^{st}$ mode of mode signal 32 corresponds to receiving the inbound RF signals having an RF carrier frequency within a $1^{st}$ frequency band 42 and the $2^{nd}$ mode of the mode signal 32 corresponds to receiving the inbound RF signals having an RF carrier frequency within the $2^{nd}$ frequency band 42.

As one of average skill in the art will appreciate, the inbound baseband signals 36 may have an in-phase component and a quadrature component. Accordingly, each of the $1^{st}$ and $2^{nd}$ frequency band transmission modules 80 and 82 produces I and Q components of the inbound baseband signals 36 from the inbound RF signals 34A or 34B in accordance with I and Q components of the $1^{st}$ or $2^{nd}$ local oscillations 30-1 or 30-2.

Figure 7:
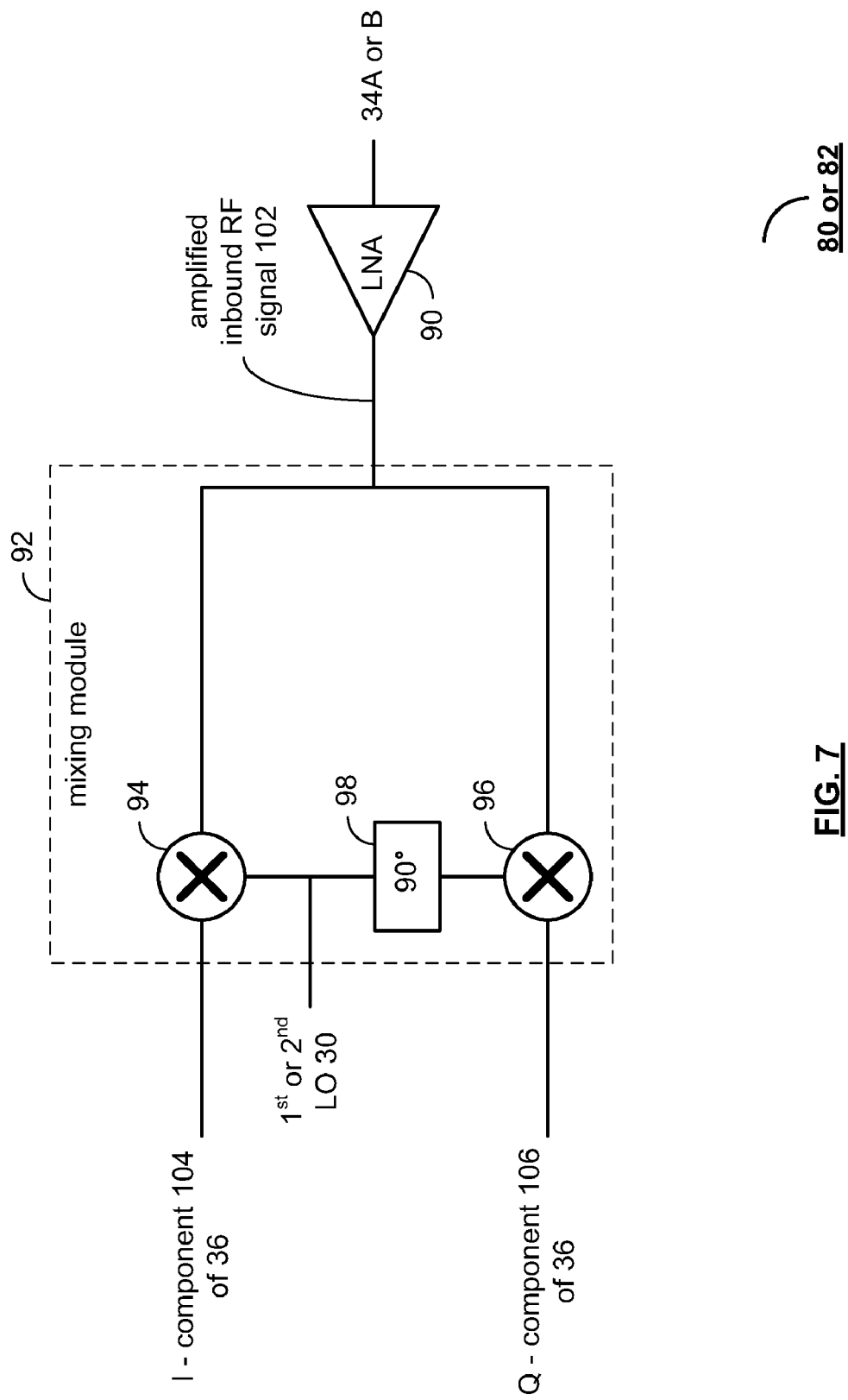
FIG. 7 is a schematic block diagram of a $1^{st}$ or a $2^{nd}$ frequency band reception module in accordance with the present invention.

FIG. 7 is a schematic block diagram of an embodiment of the $1^{st}$ and/or $2^{nd}$ frequency band reception modules 80 or 82. The module 80 or 82 includes a mixing module 92 and a low noise amplifier 90. The mixing module 92 includes a $1^{st}$ mixer 94, a $2^{nd}$ mixer 96, and a 90° phase shift module 98.

The low noise amplifier 90 receives the inbound RF signals having the $1^{st}$ or $2^{nd}$ carrier frequency 34-a or 34-b and amplifies it to produce an amplified inbound RF signal 102. The mixing module 92 receives the amplified inbound signal 102 via the $1^{st}$ mixing module 94 and the $2^{nd}$ 90° phase shift module 100. The $1^{st}$ mixing module 94 mixes the amplified inbound RF signal 102 with an in-phase component of the local oscillation 30 to produce an I component 104 of the inbound baseband signal 36.

The second mixer 96 mixes the amplified inbound RF signal 102 with a 90° phase shifted representation of the local oscillation to produce a Q component 106 of the inbound baseband signals 36.

Figure 8:
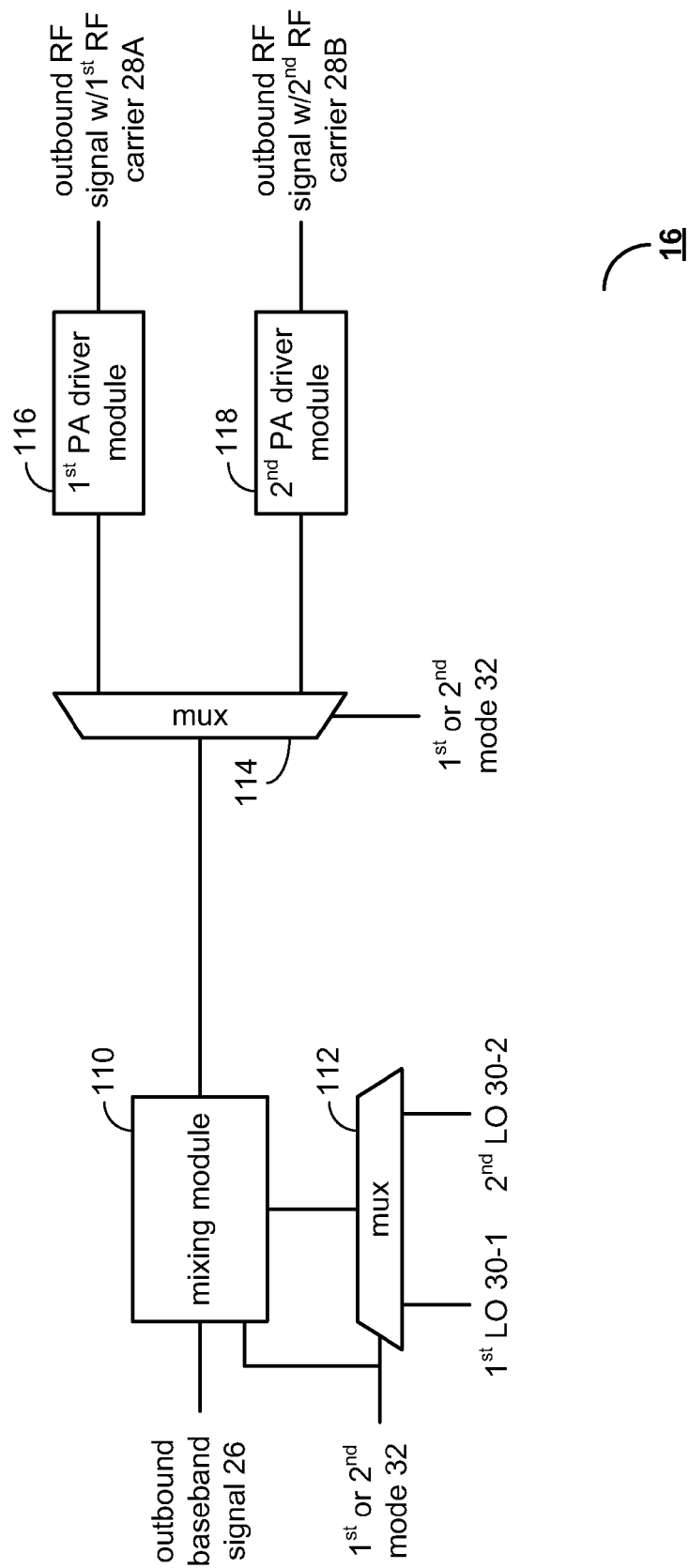
FIG. 8 is a schematic block diagram of an alternate embodiment of a multiple frequency band transmission module in accordance with the present invention.

FIG. 8 is a schematic block diagram of another embodiment of the multiple frequency baseband transmit module 16. In this embodiment, module 16 includes a mixing module 110, a $1^{st}$ multiplexer 112, a $2^{nd}$ multiplexer 144, a $1^{st}$ power amplifier driver module 116 and a $2^{nd}$ power amplifier driver module 118. The mixing module 110 receives the processed outbound baseband signals 26 and the $1^{st}$ or $2^{nd}$ mode control signal 32. Multiplexer 112 receives the $1^{st}$ and $2^{nd}$ local oscillations 30-1 and 30-2 and the $1^{st}$ or $2^{nd}$ mode control signal 32. When the integrated circuit is in a $1^{st}$ mode, the mixing module 110 is tuned to mix the outbound baseband signals 26 with the $1^{st}$ local oscillation 30-1. When the integrated circuit is in the $2^{nd}$ mode, the mixing module 110 is tuned to mix the $2^{nd}$ local oscillation 30-2 with the processed outbound baseband signals 26. The tuning of mixing module 110 includes, but is not limited to, adjusting the inductors within the mixers of the mixing module 110. For example, mixing module 110 may be similar to mixing module 60 of FIG. 5 where mixers 62 and 64 are adjustable based on the corresponding mode signal 32. In addition, the 90° phase shift module of 66, if used within mixing module 110, may also be tuned to the particular local oscillation being used.

The multiplexer 144 provides the output of mixing module 110 to either the $1^{st}$ power amplifier driver 116 or the $2^{nd}$ power amplifier driver 118 based on the mode signal 32. The $1^{st}$ power amplifier driver 116 is tuned to amplify signals having the $1^{st}$ carrier frequency to produce the RF outbound signals 28a while the $2^{nd}$ power amplifier driver module 118 is tuned to amplify the outbound RF signals having the $2^{nd}$ carrier frequency 28b.

As one of average skill in the art will appreciate, the processed outbound baseband signals 26 may have an in-phase component and a quadrature component. Accordingly, the multiple frequency band transmission module 16 produces the outbound RF signals 28a and 28b from I and Q components of the processed outbound baseband signals 26 in accordance with I and Q components of the $1^{st}$ or $2^{nd}$ local oscillations 30-1 or 30-2.

Figure 9:
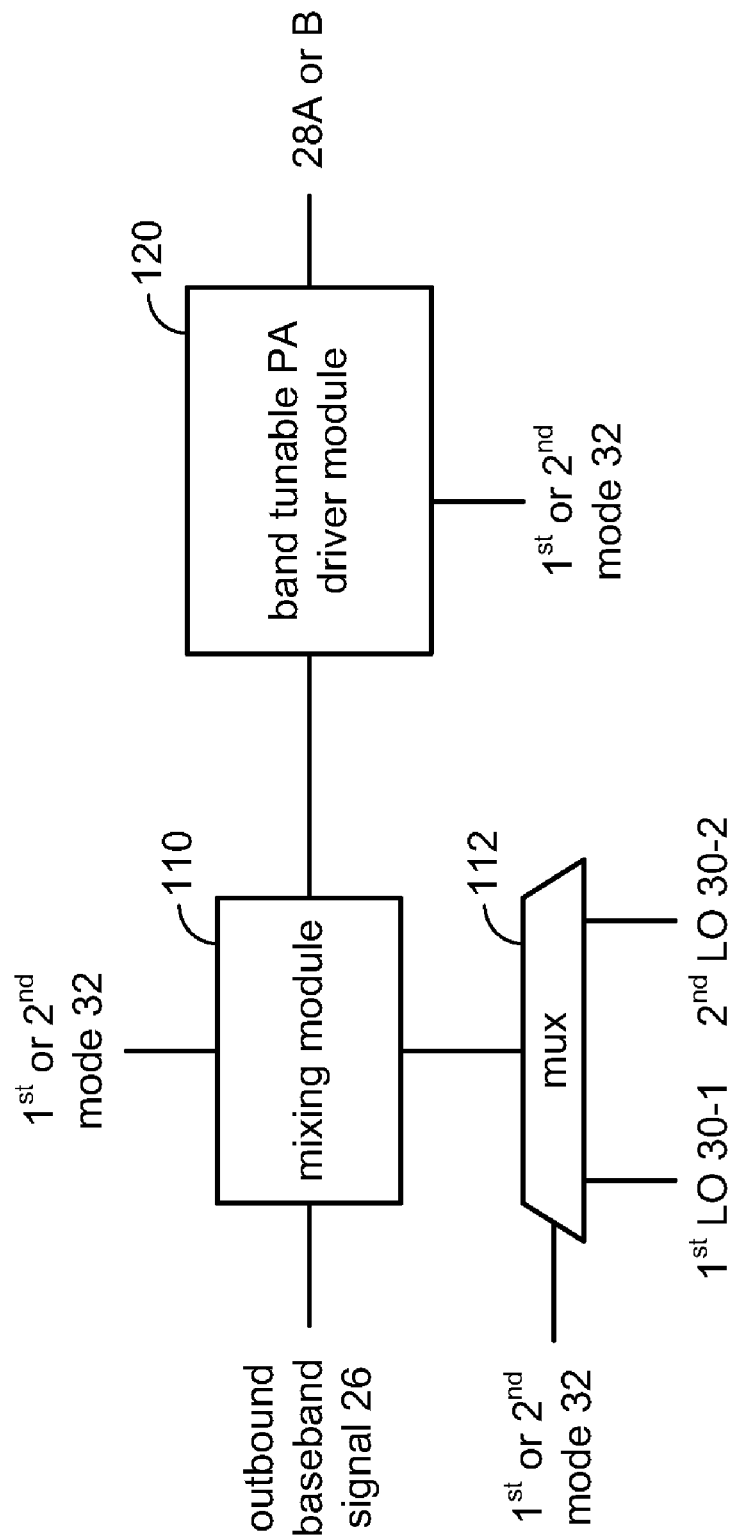
FIG. 9 is a schematic block diagram of another embodiment of a multiple frequency band transmission module in accordance with the present invention.

FIG. 9 is another embodiment of the multiple frequency band transmission module 16 that includes the mixing module 110 and a band tunable, or adjustable, power amplifier driver module 120. In this embodiment, mixing module 110 and multiplexer 112 operate as previously described with reference to FIG. 8. In this embodiment, the band tunable power amplifier driver 120 is adjusted based on the $1^{st}$ or $2^{nd}$ mode control signal 32 to produce the outbound RF signals having the $1^{st}$ or $2^{nd}$ carrier frequency 28a or 28b.

As one of average skill in the art will appreciate, the processed outbound baseband signals 26 may have an in-phase component and a quadrature component. Accordingly, the multiple frequency band transmission module 16 produces the outbound RF signals 28a and 28b from I and Q components of the processed outbound baseband signals 26 in accordance with I and Q components of the $1^{st}$ or $2^{nd}$ local oscillations 30-1 or 30-2.

Figure 10:
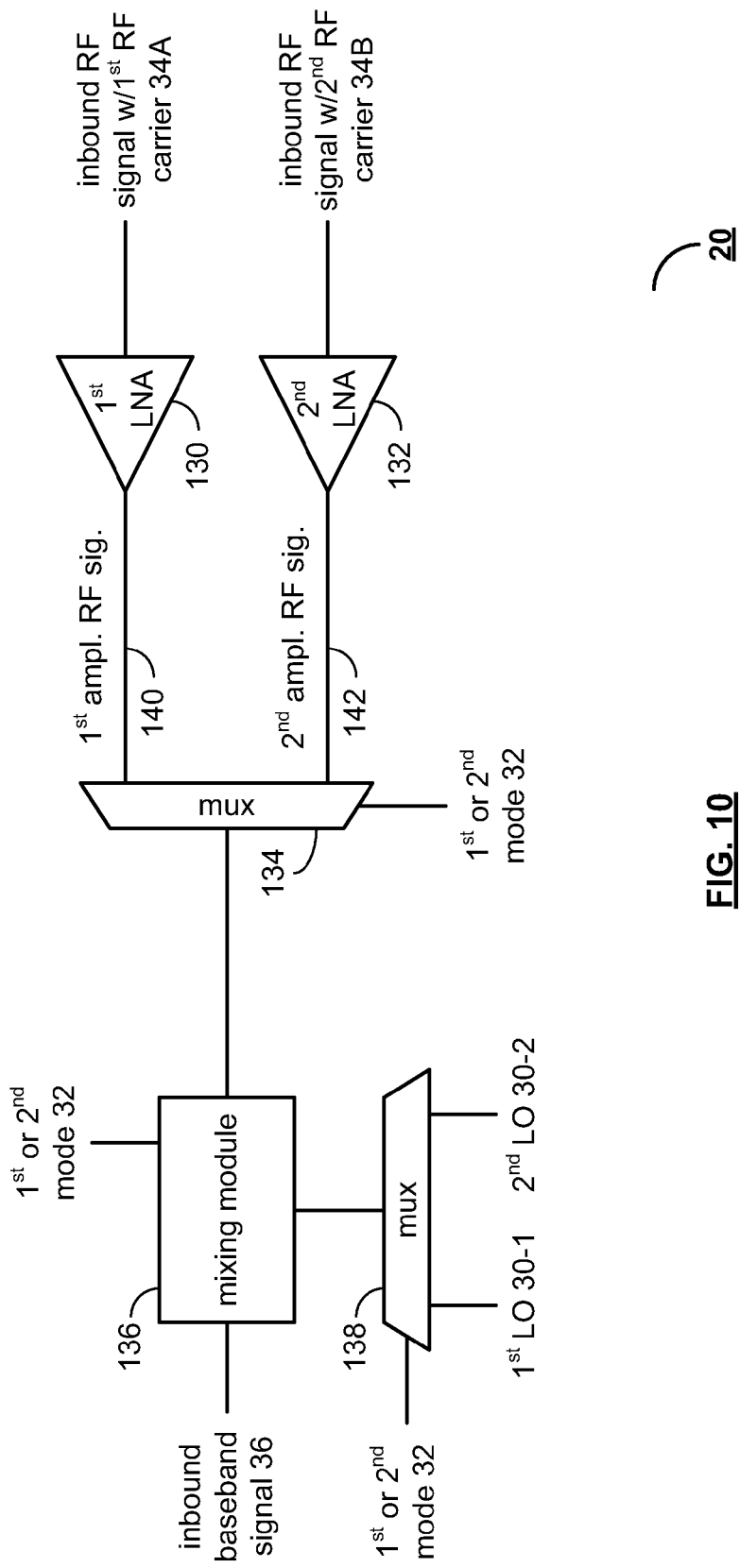
FIG. 10 is a schematic block diagram of another embodiment of a multiple frequency band reception module in accordance with the present invention.

FIG. 10 is a schematic block diagram of another embodiment of the multiple frequency band reception module 20. In this embodiment, the module 20 includes a $1^{st}$ low noise amplifier 130, a $2^{nd}$ low noise amplifier 132, a multiplexer 134, a mixing module 136 and a multiplexer 138. In a $1^{st}$ mode of operation, the $1^{st}$ low noise amplifier 130 receives inbound RF signals having a $1^{st}$ carrier frequency 34a and amplifies them to produce inbound amplified RF signals 140. Multiplexer 134, in accordance with a first mode of the $1^{st}$ or $2^{nd}$ mode control signal 32, passes the $1^{st}$ amplified RF signals 140 to the mixing module 136. In addition, multiplexer 138 provides the $1^{st}$ local oscillation 30-1 to the mixing module 136 in accordance with the first mode of the $1^{st}$ or $2^{nd}$ mode control signal 32. The mixing module 136 mixes the $1^{st}$ amplified RF signals 140 with the $1^{st}$ local oscillation 30-1 to produce the inbound baseband signal 36. In this embodiment, the mixing module 136 may be tuned in accordance with the first mode of the $1^{st}$ or $2^{nd}$ mode signal 32.

In a $2^{nd}$ mode of operation, the $2^{nd}$ low noise amplifier 132 receives the inbound RF signals having the $2^{nd}$ carrier frequency 34b and amplifies them to produce $2^{nd}$ amplified RF signals 142. In accordance with the second mode of the $1^{st}$ or $2^{nd}$ mode control signal 32, multiplexer 134 provides the $2^{nd}$ amplified RF signals 142 to the mixing module 136 and multiplexer 138 provides the $2^{nd}$ local oscillation 32 to mixing module 136. The mixing module 136 is tuned in accordance with the $1^{st}$ or $2^{nd}$ control signal 32 and mixes the $2^{nd}$ amplified RF signal 142 with the $2^{nd}$ local oscillation 30-2 to produce the inbound baseband signals 36.

As one of ordinary skill in the art will appreciate, the mixing module 136 may include similar components to mixing module 92 of FIG. 7 where the $1^{st}$ mixing module and $2^{nd}$ mixing module 94 and 96 would be adjustable based on the corresponding frequencies of operation. In addition, the $1^{st}$ and $2^{nd}$ 90° phase shift modules 98 and 100 may also be adjustable based on the particular frequencies of operation. As one of average skill in the art will further appreciate, the inbound baseband signals 36 may have an in-phase component and a quadrature component. Accordingly, multiple frequency band reception module 20 produces I and Q components of the inbound baseband signals 36 from the inbound RF signals 34A or 34B in accordance with I and Q components of the $1^{st}$ or $2^{nd}$ local oscillations 30-1 or 30-2.

Figure 11:
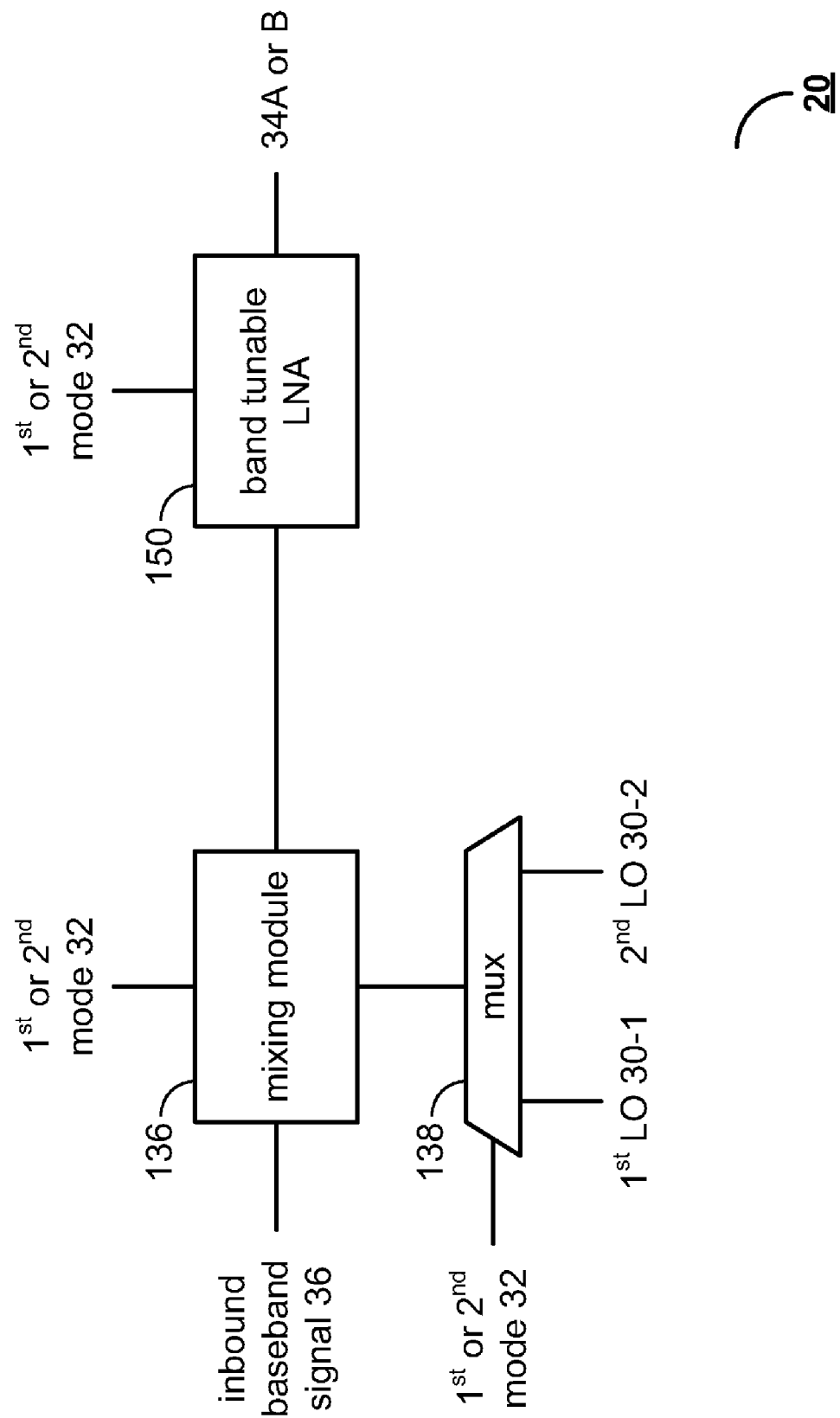
FIG. 11 is a schematic block diagram of another embodiment of a multiple frequency band reception module in accordance with the present invention.

FIG. 11 is a schematic block diagram of another embodiment of the multiple frequency band reception module 20. In this embodiment, module 20 includes the mixing module 136, the multiplexer 138, and a band tunable low noise amplifier 150. The mixing module 136 and multiplexer 138 operate as previously described with reference to FIG. 10.

The band tunable, or adjustable, LNA 150, in accordance with the $1^{st}$ or $2^{nd}$ mode control signal 32, receives the inbound RF signal having the $1^{st}$ or $2^{nd}$ carrier frequency 34a or 34b and produces there from amplified inbound RF signals. When the control signal 32 indicates the $1^{st}$ mode of operation, the low noise amplifier 150 is tuned to the frequency corresponding to the $1^{st}$ carrier frequency. In addition, the adjustable LNA 150 receives the inbound RF signals having the $1^{st}$ carrier frequency 34 to produce the amplified inbound RF signals.

In the $2^{nd}$ mode, the adjustable LNA 150 is adjusted to frequencies corresponding to the $2^{nd}$ RF carrier frequency such that it may receive and amplify the inbound RF signals having the $2^{nd}$ carrier frequency 34b. As one of average skill in the art will appreciate, the inbound baseband signals 36 may have an in-phase component and a quadrature component. Accordingly, multiple frequency band reception module 20 produces I and Q components of the inbound baseband signals 36 from the inbound RF signals 34A or 34B in accordance with I and Q components of the $1^{st}$ or $2^{nd}$ local oscillations 30-1 or 30-2.

As one of ordinary skill in the art will appreciate the multiplexers of FIGS. 8-11 may be of any construct including a current multiplexer, a voltage multiplexer, switching network, direction connection with the selective path enabled and the non-selected path disabled and/or any other means for switching and/or selecting a signal path.

Figure 12:
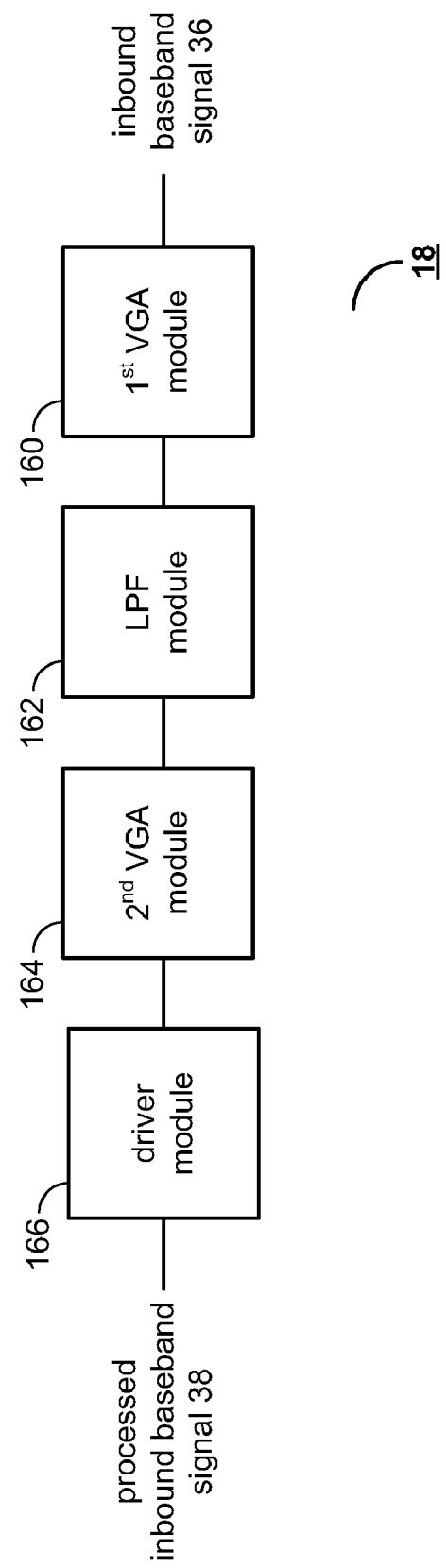
FIG. 12 is a schematic block diagram of a receiver baseband module in accordance with the present invention.

FIG. 12 is a schematic block diagram of an embodiment of the receiver baseband module 18. In this embodiment, module 18 includes a $1^{st}$ variable gain amplifier module 160, a low pass filter module 162, a $2^{nd}$ variable gain module 164 and a driver module 166. Each of the variable gain modules 160 and 164 has its gain set based on the magnitude of the inbound signals to produce a desired level for the process inbound baseband signal 38. In addition, each of the outputs of modules 160, 162 and 164 may be used for RSSI (received signal strength indication) measurements.

Figure 13:
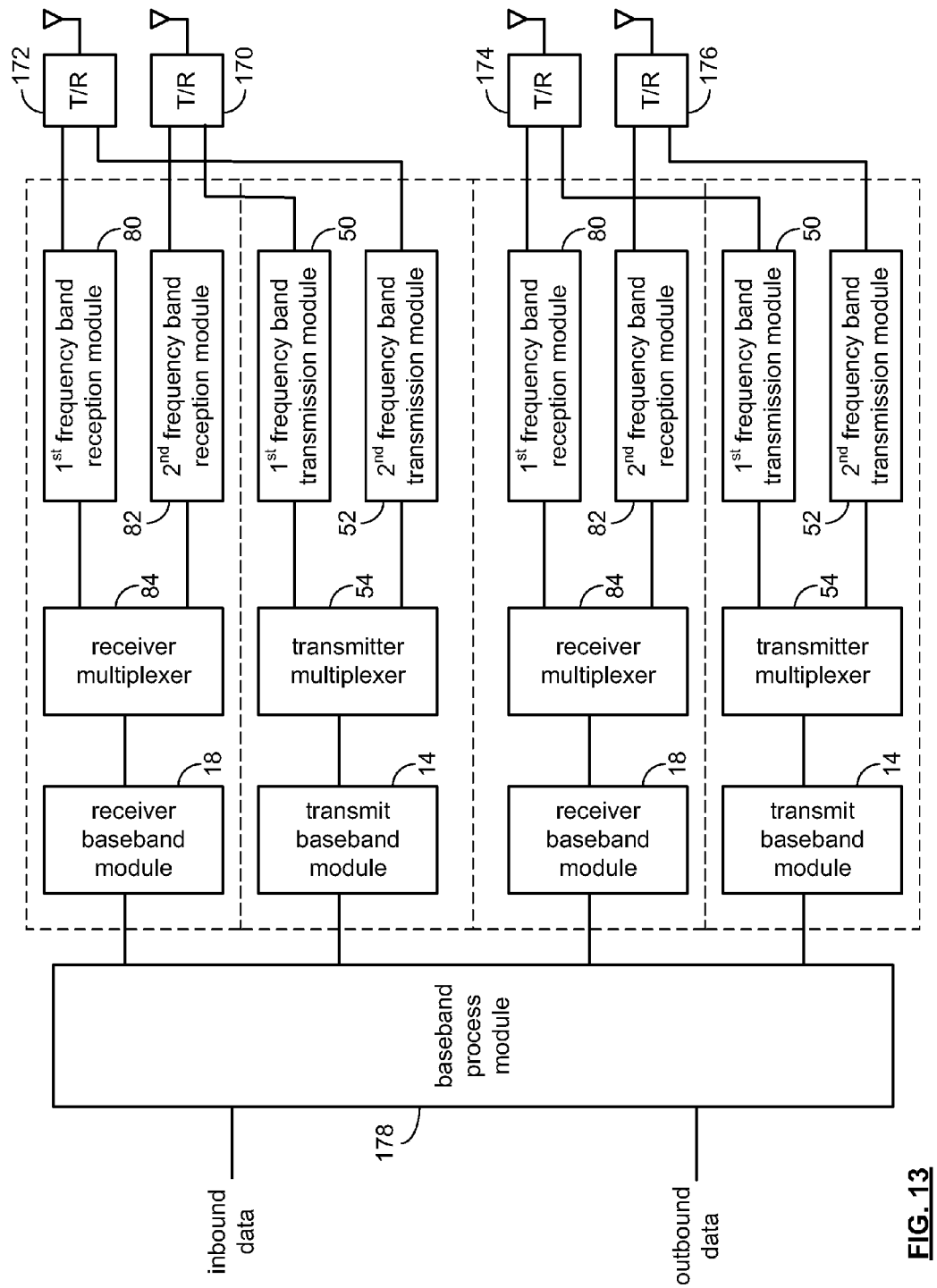
FIG. 13 is a schematic block diagram of a multiple input multiple output multiple band radio transceiver in accordance with the present invention.

FIG. 13 is a schematic block diagram of a 2×2 MIMO transceiver integrated circuit. The MIMO transceiver includes a baseband processing module 178, a plurality of transmit/receive switches 170-176, a pair of multiple band direct conversion transmit sections 10 and a pair of multiple band direct conversion receive sections 12. The multiple band direct conversion transmit section includes the $1^{st}$ and $2^{nd}$ frequency band transmission modules 50 and 52, transmit multiplexer 54 and transmit baseband module 14. Each of the multiple band direct conversion receiver sections include the $1^{st}$ and $2^{nd}$ frequency band reception modules 80 and 82, the receiver multiplexer 84 and the receiver baseband module 18.

In operation, when the 2×2 MIMO transceiver is to transmit data, the baseband processing module 178 processes outbound data and provides a portion of it to the baseband processing modules 14. Each of the baseband processing modules 14 processes their portion of the output data to produce the processed outbound baseband signals 26, which are provided to the corresponding multiplexers 54. When the device is in the $1^{st}$ mode, the $1^{st}$ frequency band transmit sections 50 are activated to convert the corresponding processed outbound baseband signals 26 into the outbound RF signals having the first RF carrier frequency, which are provided to transmit/receive switch 170 and 174, respectively, for a MIMO transmission. When the device is in the $2^{nd}$ mode, the $2^{nd}$ frequency band transmissions modules 52 are active to convert the processed outbound baseband signals into the RF signals having the second RF carrier frequency, which are provided to the RF signals to transmit receive sections 172 and 176 for a MIMO transmission.

For reception of a MIMO signal, where the device is in a $1^{st}$ mode, the $1^{st}$ frequency reception modules 80 receive the inbound RF signals having the first RF carrier frequency via transmit/receive switches 172 and 174. The $1^{st}$ frequency band reception modules 80 convert the inbound RF signals into the inbound baseband signals and provide them to multiplexers 84. Multiplexers 84 provide the inbound baseband signals to the receiver baseband processing modules 18, which produce the processed inbound baseband signals. The receiver baseband processing modules 18 provide the processed inbound baseband signals to the baseband processing module 178, which produces the inbound data from the two streams of processed inbound baseband signals.

In the $2^{nd}$ mode of operation, the $2^{nd}$ frequency band receiver modules 82 receive the inbound RF signals having the second RF carrier frequency via transmit/receive switches 170 and 176, respectfully. The $2^{nd}$ frequency band reception modules 82 convert the inbound RF signals into the inbound baseband signals and provide them to multiplexers 84. Multiplexers 84 provides the inbound baseband signals to the receiver baseband processing modules 18, which produce the processed inbound baseband signals. The receiver baseband processing modules 18 provide the processed inbound baseband signals to the baseband processing module 178, which produces the inbound data from the two streams of processed inbound baseband signals.

As one of ordinary skill in the art will appreciate, the RF transceiver of FIG. 13, which includes modules 14, 18, 54, 84, 80, 82, 50 and 52, may be implemented on one integrated circuit, may be implemented on two integrated circuits, or may be included on four integrated circuits as indicated by the dashed lines.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a multi-band direct conversion transceiver, receiver and/or transmitter. As one of average skill in the art will appreciate, other embodiments may be derived from the teachings of the present invention without deviating from the scope of the claims.

What is claimed is:

1. A multiple band direct conversion radio frequency (RF) transceiver integrated circuit (IC) comprises:
 a multiple band direct conversion transmitter section including:
 transmit baseband module coupled to receive an outbound baseband signal and to produce a processed outbound baseband signal; and
 a multiple frequency band transmission module coupled to convert the processed outbound baseband signal into an outbound RF signal having a first RF carrier frequency within a first frequency band in accordance with a first band local oscillation when in a first mode and coupled to convert the processed outbound baseband signal into an outbound RF signal having a second RF carrier frequency within a second frequency band in accordance with a second band local oscillation when in a second mode;
 a multiple band direct conversion receiver section including:
 a multiple frequency band reception module coupled to convert an inbound RF signal having the first RF carrier frequency into an inbound baseband signal in accordance with the first band local oscillation when in the first mode and coupled to convert an inbound RF signal having the second RF carrier frequency into the inbound baseband signal into in accordance with the second band local oscillation when in the second mode; and
 a receiver baseband module coupled to receive the inbound baseband signal and to produce a processed inbound baseband signal; and
 a local oscillation generation module coupled to generate the first frequency band local oscillation when in the first mode and coupled to generate the second frequency band local oscillation when in the second mode.

2. The multiple band direct conversion RF transceiver IC of claim 1, wherein the multiple frequency band transmission module comprises:
 a first frequency band transmission module coupled to convert the processed outbound baseband signal into the outbound RF signal having the first RF carrier frequency in accordance with the first band local oscillation;
 a second frequency band transmission module coupled to convert the processed outbound baseband signal into the outbound RF signal having the second RF carrier frequency in accordance with the second band local oscillation; and
 a transmitter multiplexer coupled to provide the processed outbound baseband signal to the first frequency band transmission module when in the first mode and coupled to provide the processed outbound baseband signal to the first frequency band transmission module when in the second mode.

3. The multiple band direct conversion RF transceiver IC of claim 2, wherein each of the first and second frequency band transmission modules comprises:

a mixing module coupled to mix the processed outbound baseband signal with the first or second band local oscillation to produce a mixed signal; and a power amplifier driver module coupled to amplify the mixed signal to produce the outbound RF signal having the first or second RF carrier frequency.

4. The multiple band direct conversion RF transceiver IC of claim 1, wherein the multiple frequency band reception module comprises:

a first frequency band reception module coupled to convert the inbound RF signal having the first RF carrier frequency into the inbound baseband signal in accordance with the first band local oscillation;

a second frequency band reception module coupled to convert the inbound RF signal having the second RF carrier frequency into the inbound baseband signal into in accordance with the second band local oscillation; and a receiver multiplexer coupled to provide the inbound baseband signal from the first frequency band reception module to the receiver baseband module when in the first mode and coupled to provide the inbound baseband signal from the second frequency band reception module to the receiver baseband module when in the second mode.

5. The multiple band direct conversion RF transceiver IC of claim 4, wherein each of the first and second frequency band reception modules comprises:

a low noise amplifier coupled to amplify the in the inbound RF signal having the first or second RF carrier frequency into an amplified inbound RF signal; and a mixing module coupled to mix the amplified inbound RF signal with the first or second band local oscillation to produce the inbound baseband signal.

6. The multiple band direct conversion RF transceiver IC of claim 1, wherein the multiple frequency band transmission module comprises:

a mixing module coupled to mix the processed outbound baseband signal with the first band local oscillation when in the first mode to produce first mixed signal and to mix the processed outbound baseband signal with the second band local oscillation when in the second mode to produce a second mixed signal;

first multiplexer coupled to provide the first or second band local oscillation to the mixing module in accordance with the multiple band direct conversion RF transceiver IC being in the first or second mode, respectively;

a first power amplifier driver module coupled to amplify the first mixed signal to provide the outbound RF signal having the first RF carrier frequency;

a second power amplifier driver module coupled to amplify the second mixed signal to provide the outbound RF signal having the second RF carrier frequency; and a second multiplexer coupled to provide the first mixed signal to the first power amplifier driver module when in the first mode and to provide the second mixed signal to the second power amplifier driver module when in the second mode.

7. The multiple band direct conversion RF transceiver IC of claim 1, wherein the multiple frequency band transmission module comprises:

a mixing module coupled to mix the processed outbound baseband signal with the first band local oscillation when in the first mode to produce first mixed signal and to mix the processed outbound baseband signal with the second band local oscillation when in the second mode to produce a second mixed signal;

first multiplexer coupled to provide the first or second band local oscillation to the mixing module in accordance with the multiple band direct conversion RF transceiver IC being in the first or second mode, respectively; and an adjustable power amplifier driver module coupled to amplify the first mixed signal to provide the outbound RF signal having the RF carrier frequency within the first frequency band when in the first mode and coupled to amplify the second mixed signal to provide the outbound RF signal having the RF carrier frequency within the second frequency band when in the second mode.

8. The multiple band direct conversion RF transceiver IC of claim 1, wherein the multiple frequency band reception module comprises:

a first low noise amplifier coupled to amplify the inbound RF signal having the first RF carrier frequency to produce a first amplified inbound RF signal;

a second low noise amplifier coupled to amplify the inbound RF signal having the second RF carrier frequency to produce a second amplified inbound RF signal;

a mixing module;

a first multiplexer coupled to provide the first amplified inbound RF signal to the mixing module when in the first mode and to provide the second amplified inbound RF signal to the mixing module when in the second mode; and a second multiplexer coupled to provide the first band local oscillation to the mixing module when in the first mode and to provide the second band local oscillation to the mixing module when in the second mode, wherein the mixing module mixes the first band local oscillation and the first amplified inbound RF signal or mixes the second band local oscillation and the second amplified inbound RF signal to produce the inbound baseband signal.

9. The multiple band direct conversion RF transceiver IC of claim 1, wherein the multiple frequency band reception module comprises:

an adjustable low noise amplifier coupled to amplify the inbound RF signal having the first RF carrier frequency to produce a first amplified inbound RF signal and coupled to amplify the inbound RF signal having the second RF carrier frequency to produce a second amplified inbound RF signal;

a mixing module; and a multiplexer coupled to provide the first band local oscillation to the mixing module when in the first mode and to provide the second band local oscillation to the mixing module when in the second mode, wherein the mixing module mixes the first band local oscillation and the first amplified inbound RF signal or mixes the second band local oscillation and the second amplified inbound RF signal to produce the inbound baseband signal.

10. The multiple band direct conversion RF transceiver IC of claim 1, wherein the receiver baseband module comprises:

a first variable gain amplifier module coupled to amplify the inbound baseband signal in accordance with a first gain setting to produce amplified inbound baseband signal;

a low pass filter module coupled to low pass filter the amplified inbound baseband signal to produce filtered inbound baseband signal;

a second variable gain amplifier module coupled to amplify the filtered inbound baseband signal in accordance with a second gain setting to produce second amplified baseband signal; and a driver module coupled to drive the second amplified baseband signal to produce the processed inbound baseband signal.

11. A multiple band direct conversion radio frequency (RF) transmitter integrated circuit (IC) comprises:
- a transmit baseband module coupled to receive an outbound in-phase baseband signal component and an outbound quadrature baseband signal component of an outbound baseband signal and to produce a processed outbound in-phase baseband signal component and a processed quadrature baseband signal component;
- a multiple frequency band transmission module coupled to convert the processed outbound in-phase baseband signal component and the processed quadrature baseband signal component into an outbound RF signal having a first RF carrier frequency within a first frequency band in accordance with a first band local oscillation when in a first mode and coupled to convert the processed outbound in-phase baseband signal component and the processed quadrature baseband signal component into an outbound RF signal having a second RF carrier frequency within a second frequency band in accordance with a second band local oscillation when in a second mode; and
- a local oscillation generation module coupled to generate the first frequency band local oscillation when in the first mode and coupled to generate the second frequency band local oscillation when in the second mode.

12. The multiple band direct conversion RF transmitter IC of claim 11, wherein the multiple frequency band transmission module comprises:
- a first frequency band transmission module coupled to convert the processed outbound in-phase baseband signal component and the processed quadrature baseband signal component into the outbound RF signal having the first RF carrier frequency in accordance with the first band local oscillation;
- a second frequency band transmission module coupled to convert the processed outbound in-phase baseband signal component and the processed quadrature baseband signal component into the outbound RF signal having the second RF carrier frequency in accordance with the second band local oscillation; and
- a transmitter multiplexer coupled to provide the processed in-phase signal component and the processed quadrature signal component to the first frequency band transmission module when in the first mode and coupled to provide the processed in-phase signal component and the processed quadrature signal component to the first frequency band transmission module when in the second mode.

13. The multiple band direct conversion RF transmitter IC of claim 12, wherein each of the first and second frequency band transmission modules comprises:
- a mixing module coupled to mix the processed outbound in-phase baseband signal component and the processed quadrature baseband signal component with the first or second band local oscillation to produce a mixed signal; and
- a power amplifier driver module coupled to amplify the mixed signal to produce the outbound RF signal having the first or second RF carrier frequency.

14. The multiple band direct conversion RF transmitter IC of claim 11, wherein the multiple frequency band transmission module comprises:
- a mixing module coupled to mix the processed outbound in-phase baseband signal component and the processed quadrature baseband signal component with the first band local oscillation when in the first mode to produce first mixed in-phase and quadrature signal components and to mix the processed outbound in-phase baseband signal component and the processed quadrature baseband signal component with the second band local oscillation when in the second mode to produce second mixed in-phase and quadrature signal components;
- first multiplexer coupled to provide the first or second band local oscillation to the mixing module in accordance with the multiple band direct conversion RF transmitter IC being in the first or second mode, respectively;
- a first power amplifier driver module coupled to amplify the first mixed in-phase and quadrature signal components to provide the outbound RF signal having the first RF carrier frequency;
- a second power amplifier driver module coupled to amplify the second mixed in-phase and quadrature signal components to provide the outbound RF signal having the second RF carrier frequency; and
- a second multiplexer coupled to provide the first mixed in-phase and quadrature signal components to the first power amplifier driver module when in the first mode and to provide the second mixed in-phase and quadrature signal components to the second power amplifier driver module when in the second first mode.

15. The multiple band direct conversion RF transmitter of claim 11, wherein the multiple frequency band transmission module comprises:
- a mixing module coupled to mix the processed outbound in-phase baseband signal component and the processed quadrature baseband signal component with the first band local oscillation when in the first mode to produce first mixed in-phase and quadrature signal components and to mix the processed outbound in-phase baseband signal component and the processed quadrature baseband signal component with the second band local oscillation when in the second mode to produce second mixed in-phase and quadrature signal components;
- first multiplexer coupled to provide the first or second band local oscillation to the mixing module in accordance with the multiple band direct conversion RF transmitter IC being in the first or second mode, respectively; and
- an adjustable power amplifier driver module coupled to amplify the first mixed in-phase and quadrature signal components to provide the outbound RF signal having the first RF carrier frequency when in the first mode and coupled to amplify the second mixed in-phase and quadrature signal components to provide the outbound RF signal having the second RF carrier frequency when in the second mode.

16. A multiple band direct conversion radio frequency (RF) receiver integrated circuit (IC) comprises:
- a multiple frequency band reception module coupled to convert an inbound RF signal having a first RF carrier frequency within a first frequency band into an inbound in-phase baseband signal component and an inbound quadrature baseband signal component in accordance with a first band local oscillation when in a first mode and coupled to convert an inbound RF signal having a second RF carrier frequency within a second frequency band into an inbound in-phase baseband signal component and the inbound quadrature baseband signal component into in accordance with the second band local oscillation when in a second mode;
- a receiver baseband module coupled to receive the inbound in-phase baseband signal component and the inbound quadrature baseband signal component and to produce a processed inbound in-phase baseband signal component and a processed inbound quadrature baseband signal component; and a local oscillation generation module coupled to generate the first frequency band local oscillation when in the first mode and coupled to generate the second frequency band local oscillation when in the second mode.

17. The multiple band direct conversion RF receiver IC of claim 16, wherein the multiple frequency band reception module comprises:

a first frequency band reception module coupled to convert the inbound RF signal having the first RF carrier frequency into the inbound in-phase baseband signal component and the inbound quadrature baseband signal component in accordance with the first band local oscillation; and a second frequency band reception module coupled to convert the inbound RF signal having the second RF carrier frequency into the inbound in-phase baseband signal component and the inbound quadrature baseband signal component into in accordance with the second band local oscillation; and a receiver multiplexer coupled to provide the inbound in-phase baseband signal component and the inbound quadrature baseband signal component from the first frequency band reception module to the receiver baseband module when in the first mode and coupled to provide the inbound in-phase baseband signal component and the inbound quadrature baseband signal component from the second frequency band reception module to the receiver baseband module when in the second mode.

18. The multiple band direct conversion RF receiver IC of claim 17, wherein each of the first and second frequency band reception modules comprises:

a low noise amplifier coupled to amplify the in the inbound RF signal having the first or second RF carrier frequency into an amplified inbound RF signal; and a mixing module coupled to mix the amplified inbound RF signal with the first or second band local oscillation to produce the inbound in-phase baseband signal component and the inbound quadrature baseband signal component.

19. The multiple band direct conversion RF receiver IC of claim 16, wherein the multiple frequency band reception module comprises:

a first low noise amplifier coupled to amplify the inbound RF signal having the first RF carrier frequency to produce a first amplified inbound RF signal;

a second low noise amplifier coupled to amplify the inbound RF signal having the second RF carrier frequency to produce a second amplified inbound RF signal;

a mixing module;

a first multiplexer coupled to provide the first amplified inbound RF signal to the mixing module when in the first mode and to provide the second amplified inbound RF signal to the mixing module when in the second mode; and a second multiplexer coupled to provide the first band local oscillation to the mixing module when in the first mode and to provide the second band local oscillation to the mixing module when in the second mode, wherein the mixing module mixes the first band local oscillation and the first amplified inbound RF signal or mixes the second band local oscillation and the second amplified inbound RF signal to produce the inbound in-phase baseband signal component and the inbound quadrature baseband signal component.

20. The multiple band direct conversion RF receiver IC of claim 16, wherein the multiple frequency band reception module comprises:

an adjustable low noise amplifier coupled to amplify the inbound RF signal having the first RF carrier frequency to produce a first amplified inbound RF signal and coupled to amplify the inbound RF signal having the second RF carrier frequency to produce a second amplified inbound RF signal;

a mixing module; and a multiplexer coupled to provide the first band local oscillation to the mixing module when in the first mode and to provide the second band local oscillation to the mixing module when in the second mode, wherein the mixing module mixes the first band local oscillation and the first amplified inbound RF signal or mixes the second band local oscillation and the second amplified inbound RF signal to produce the inbound in-phase baseband signal component and the inbound quadrature baseband signal component.

* * * * *

UNITED STATES PATENT AND TRADEMARK OFFICE
CERTIFICATE OF CORRECTION

PATENT NO. : 8,364,106 B2
APPLICATION NO. : 12/861365
DATED : January 29, 2013
INVENTOR(S) : Arya Reza Behzad It is certified that error appears in the above-identified patent and that said Letters Patent is hereby corrected as shown below:

In the Claims

Col. 12, line 37, in claim 1: before "in accordance with" delete "into"
Col. 13, lines 17-18, in claim 4: before "in accordance with" delete "into"
Col. 13, line 29, in claim 5: after "to amplify" delete "the in"
Col. 16, line 26, in claim 14: replace "when in the second first mode" with --when in the second mode--
Col. 16, line 64, in claim 16: before "in accordance with" delete "into"
Col. 17, line 21, in claim 17: before "in accordance with" delete "into"
Col. 17, line 36, in claim 18: after "to amplify" delete "the in"

Signed and Sealed this
Twenty-fifth Day of February, 2014

Michelle K. Lee
*Deputy Director of the United States Patent and Trademark Office*